Patented Mar. 22, 1932

1,850,644

UNITED STATES PATENT OFFICE

JOHN T. TRAVERS, OF COLUMBUS, CHARLES H. LEWIS, OF HARPSTER, AND OLIVER M. URBAIN, OF COLUMBUS, OHIO, ASSIGNORS TO THE OHIO SANITARY ENGINEERING CORPORATION, OF COLUMBUS, OHIO, A CORPORATION OF OHIO

METHOD FOR PURIFYING POLLUTED LIQUIDS

No Drawing.   Application filed October 20, 1928.   Serial No. 313,929.

This invention relates to a method for purifying polluted liquids. In its more specific aspect, the invention has reference to the treatment of water to remove the phenols therefrom. The term, "phenols" as generally employed in this specification is defined as the hydroxy derivatives of benzene, resulting from the substitution of an OH group for one or more atoms of hydrogen on the benzene molecule. Common phenol, so called, is a mono-hydroxy-benzene, having the formula $C_6H_5OH$. It is the most common of all the phenols. The other three principal phenols are, ortho-cresol, meta-cresol and para-cresol. The formula of these three cresols is, $CH_3C_6H_4OH$ and they differ in structure only in their structural formulas.

It is a well recognized fact that the city water supplies, especially in the industrial areas of the United States, are contaminated with phenols. The sources of the phenols are various and due to their extreme stability they constitute a very great menace in water supplies. Phenols are not oxidizable by any of the natural oxidizing agents. They have been known to retain their polluting effect in streams for a distance of seventy-five miles from the source of the phenols.

The polluting effect is exceedingly objectionable, even when the phenols are present in extraordinarily small concentrations, as for example, when they are present only in an amount equal to 1 part in 500,000,000 parts of water. Their principal effect is to impart to the water a most disagreeable odor and taste. These effects, of the presence of phenols in water, are greatly magnified by the treatment of the water by chlorine, as practiced in conventional water purification processes. The chlorination treatment results in the formation of chlor-phenols, which are even more objectionable than the parent phenols.

It is appreciated that various endeavors have been made to overcome the polluting effects of phenols in water. A considerable degree of success has been attained in the treatment of liquids containing phenoloid bodies with reagents which function to transform the phenols into odorless and tasteless compounds. However, when solutions containing phenols are so treated, the objectionable odors and tastes usually re-occur if the water is subsequently subjected to chlorination. Furthermore, treatments contemplating a reaction with the phenols necessitate considerable modification in the current water purification methods and installations. It is also appreciated that many attempts have been made to remove phenols from water by absorption methods. Extensive experimentation with the absorption methods heretofore suggested for the treatment of water containing phenols, has demonstrated that these treatments are only partially effective, and that when the effluents from such treatments are subjected to chlorination, there is a very material and objectionable presence of chlor-phenol tastes and odors.

The present invention contemplates the provision of a process of adsorption for removal of phenols in their various forms from water. It is a specific object of the invention to provide such a process which may be incorporated in the present water purification plants without material modification, and which process, when followed by the conventional chlorination treatment, leaves the final water absolutely and completely free from chlor-phenol tastes and odors.

The process contemplates the subjection of the phenol containing water to the action of an adsorbent having the capacity to completely adsorb all of the phenoloid bodies in the water, and to employ in the process an adsorbent having a rate of absorption which will permit of economical and commercial removal of phenols from water. More specifically the invention contemplates the passing of the water containing phenols through a filter composed of a granular mass having as its base a salt of a condensed ortho-silicic acid and a trivalent metal, a kaolinite-bearing substance being preferably employed. In the preferred operation of the process, the phenol containing water is passed through such a filter, the base content of which has had its adsorption rate and capacity increased by treatment with a solution of a silicate of an alkali metal, preferably sodium silicate, and a dilute solution of a strong acid, preferably sulphuric acid.

It will be appreciated that the base of the adsorbent filter, as for example, the kaolinite-bearing material, if dried and granulated, following the treatment with the solution of the silicate of an alkali metal and the dilute acid.

Best results are obtained in the practice of the process, when the adsorbent filtering material is produced in the following manner:

Mixing with the base material, that is, the salt of a condensed ortho-silicic acid and a trivalent metal, preferably a kaolinite-bearing substance, a quantity of carbonaceous material such as coal, sugar, or sawdust, in an amount not to exceed 75% by weight of the base material; treating the resultant mixture with the solution of the silicate of an alkali metal, preferably sodium silicate, in an amount adequate to form a paste; incorporating in this paste a dilute solution of a strong acid, such as sulphuric acid, nitric acid, hydrochloric or acetic acid; allowing a time period of aproximately two hours for the formation of silica-gels to occur. Following the gelation period subjecting the mass to a slow drying action, preferably to initial air drying at room temperature for from 4 to 6 hours, followed by drying at a temperature of approximately 90 degrees centigrade, and thereafter subjecting the dry mass to ignition at a temperature of approximately from 600 to 900 degrees C., preferably in a reducing atmosphere, to drive off the volatile constituents of the added carbonaceous material and the chemically combined water.

A hundred pounds of the adsorbent filtering material may be produced in accordance with the above process, employing the component constituents in the following proportion:

|  | Pounds |
| --- | --- |
| A salt of a condensed ortho-silicic acid and a trivalent metal, for example, (kaolinite-bearing material) | 28.3 |
| Carbonaceous material (dry yellow pine sawdust) | 21.3 |
| Sodium silicate solution (specific gravity 1.38) | 44.2 |
| Sulphuric acid (specific gravity 1.25) | 67.7 |

It will be appreciated that there occurs during the process of manufacture, a loss of approximately 61.5 pounds, this being largely the water removed together with the volatile hydro-carbons driven off from the carbonaceous material. The adsorbent filtering material, prepared as above outlined, possesses the capacity to completely adsorb phenols from water when the volume of the filter and the time period of contact between the water and the adsorbent are properly controlled.

Experience has proved that a very substantial removal of phenols from water can be effected by using an untreated salt of a condensed ortho-silicic acid and a trivalent metal as synthetically produced or as it occurs in nature. The effectiveness of this adsorbent filtering material is, however, improved by treatment as above outlined and the preferred embodiment of this invention contemplates the treating of water containing phenols with the final product of the treatment specifically above set forth.

The capacity of the material to adsorb phenol was found to vary somewhat with the concentration of the phenol in the water with which it was placed in contact. With a 1 p. p. m. phenol solution the material will adsorb an amount of phenol equal to 1/60 of its weight; with a 10 p. p. m. phenol solution 1/67 of its weight; with a 100 p. p. m. phenol solution 1/71 of its weight.

To treat 1,000,000 gallons of water containing 1 p. p. m. of phenol in 24 hours will require a filter bed approximately 10 ft. long, 10 ft. deep and 1.24 ft. wide. This filter contains approximately 4,130 pounds of adsorbent which has a capacity of substantially 68.8 pounds of phenol before regeneration becomes necessary. Since a million gallons of water containing 1 p. p. m. of phenol contains 8.82 pounds of phenol, the filter above described should be regenerated about once a week.

Experience has further proved that the phenols contained in water should be maintained in contact with the adsorbent filtering material for a time period of from 20 to 40 minutes, preferably approximately 30 minutes.

Since, as above stated, the adsorptive capacity of the filter is reached in about a week, it is here pertinent to point out that the adsorbent filtering material may be regenerated by passing live steam therethru, preferably released from a pressure of 100 pounds, in a period of from 10 to 15 minutes.

If it should be desired to recover the phenols adsorbed from the water in the filter, this may be accomplished during the regeneration period, by conducting the phenol vapors from the filter to a benzol recovery tower of conventional design. The phenols thus recovered are of a high degree of purity. If the phenol vapors are not recovered, they should be conveyed to a suitable stack and released into the atmosphere at a reasonable distance from the plant.

Phenol solutions of varying concentrations can be effectively treated by this process, it being only necessary to employ the adsorbent filtering material in an amount adequate to give the necessary adsorptive capacity. Due to the extreme ease with which the adsorption filter material may be regenerated, the cost of operation of the process, other than the initial installation of the filter, is practically negligible. It completely removes all phenols from the water so that any subsequent treatment with chlorine leaves the water entirely free from any trace of chlor-phenol tastes and odors.

Where the water to be treated carries matter in suspension, it would, of course, be desirable to coagulate such matter, previous to passage through the adsorbent filtering material.

The adsorbent filter should, it will be appreciated, be so constructed that the rate of flow through the adsorbent material can be accurately controlled. It is desirable to retard the flow through the adsorbent material by the provision of suitable baffles or the like. It will also be appreciated that the container for the adsorbent filtering material should be provided with perforated steam connections for introducing live steam to effect regeneration of the filtering material.

This process is equally effective to remove phenol when originally present in the water in the combined form of calcium phenolate. Phenol is present in this combined form in some wastes particularly in ammonia still liquors. The calcium phenolate, however, hydrolizes, forming phenol and calcium hydroxide and this hydrolysis proceeds until the pH of the resultant solution is 9, at which point the hydrolysis reaction reaches an equilibrium.

If such a solution be then passed through the adsorbent filter of this invention, the free phenol contained is adsorbed, permitting the hydrolysis reaction to proceed to the right, resulting in the ultimate complete hydrolysis of the calcium phenolate and the complete adsorption of the phenols so formed.

The hydrolysis proceeds as fast as the rate of adsorption of the liberated phenol by the adsorbent filter.

What we claim for our invention is:

1. A process for removing phenols from water comprising subjecting the water to the action of a solid adsorbent containing a kaolinite-bearing substance which has been treated with a solution of a silicate of an alkali metal.

2. A process for removing phenols from water comprising subjecting the water to the action of a solid adsorbent containing a kaolinite-bearing substance which has been treated with a solution of a silicate of an alkali metal and a dilute solution of a strong acid.

3. A process for removing phenols from water comprising passing the water containing phenols through a filter in the form of a kaolinite-bearing substance in the form of granules, maintaining a period of contact between the adsorbent filtering material and the water from 20 to 40 minutes.

4. A process for removing phenols from water comprising passing the water containing phenols through a filter in the form of granules containing a kaolinite-bearing substance, maintaining a period of contact between the adsorbent filtering material and the water of substantially 30 minutes.

5. A method for treating water containing phenols, comprising subjecting the water containing phenols to the action of a solid adsorbent containing a kaolinite-bearing substance which has been treated with a sodium silicate solution of substantially 1.38 specific gravity.

6. A process for treating water containing phenols, comprising subjecting the water to the action of a kaolinite-bearing substance, which has been treated with a solution of the silicate of an alkali metal and a sulphuric acid solution of substantially 1.25 specific gravity.

7. A process for treating water containing phenols, comprising subjecting the water to the action of a solid adsorbent containing a kaolinite-bearing substance, which has been treated with a sodium silicate solution of substantially 1.38 specific gravity and a sulphuric acid solution of substantially 1.25 specific gravity.

8. A process for removing phenols from water comprising subjecting the water to the action of a salt of a condensed ortho silicic acid and a trivalent metal which has been treated with a solution of a silicate of an alkali metal and a dilute solution of sulphuric acid, the silicate of the alkali metal and the dilute solution of the sulphuric acid being in such proportions that the sulphuric acid is neutralized by the silicate of the alkali metal.

9. A process for removing phenols from water comprising subjecting the water to the action of a salt of a condensed ortho silicic acid and a trivalent metal which has been treated with a solution of a silicate of an alkali metal and a dilute solution of a strong acid, the silicate of the alkali metal and the strong acid being employed in equivalent reactive proportions.

JOHN T. TRAVERS.
CHARLES H. LEWIS.
OLIVER M. URBAIN.